3,741,860
SYNTHETIC PAPERLIKE FILM SUITABLE FOR WRITING AND PRINTING AND ITS PREPARATION

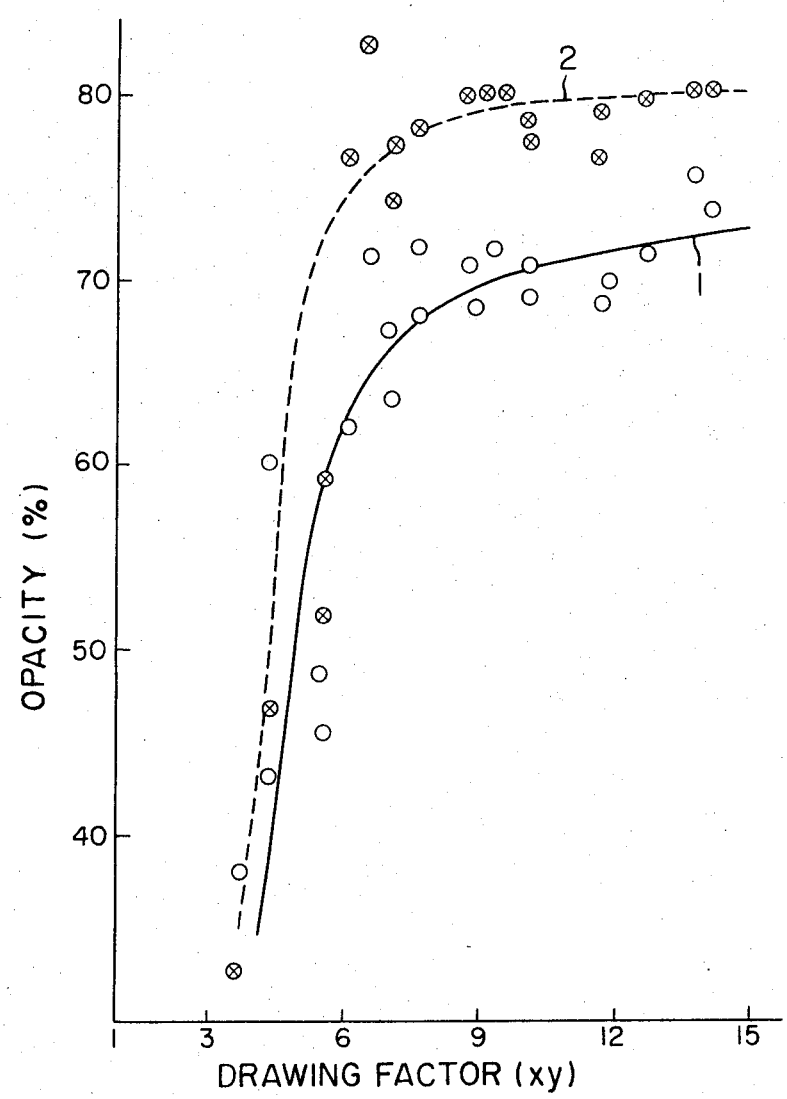

Hiro Otsubo, Yoichi Shin, Yoichi Kobayashi, and Makoto Sumiyoshi, Yokkaichi, Japan, assignors to Kabushiki Kaisha Oji Yuka Goseishi Kenkyujo, Chiyoda-ku, Tokyo-to, Japan
Filed Nov. 30, 1970, Ser. No. 93,714
Claims priority, application Japan, Nov. 28, 1969, 44/95,519; Mar. 12, 1970, 45/20,435; Aug. 26, 1970, 45/74,267
Int. Cl. B32b 5/16
U.S. Cl. 161—162      14 Claims

ABSTRACT OF THE DISCLOSURE

A film of a high-impact polystyrene in which minute rubber particles are dispersed in a polystyrene resin matrix is biaxially drawn with a drawing factor (product of biaxial elongations) greater than 6 and then treated at a temperature above 30° C. with a solvent which exhibits swelling-inducing action with respect to the rubber particles, and thereafter these actions of the solvent are stopped by cooling the film to a temperature at which the solvent does not exhibit these actions.

BACKGROUND OF THE INVENTION

This invention relates generally to synthetic papers and more particularly to the production of films suitable for use for writing and printing.

Attempts to render films comprising polystyrene resins as basic materials into paper-like films have already been made. In most of these attempts, the process has comprised, principally, treating the surfaces of a film of foamed or unfoamed polystyrene with a solvent for polystyrene or a swelling agent and then treating the same with a non-solvent of polystyrene thereby to foam a whitened layer on the film surfaces. By such a process, however, synthetic papers of fully satisfactory writability and printability cannot be produced.

SUMMARY OF THE INVENTION

It is an object of the present invention to solve the above stated problem. We have found that this object and other objects of the invention can be achieved by using, as the basic polystyrene material, a biaxially-drawn film of a polystyrene resin in which fine particles of an elastomeric or rubbery substance have been dispersed and subjecting the same to a specific solvent treatment.

Accordingly, in accordance with its broadest definition, this invention is characterized by the procedure of preparing a biaxially-drawn film comprising a polystyrene resin in which minute particles of a rubbery component have been dispersed, treating this drawn film with a solvent exhibiting solvent or dissolving action with respect to the polystyrene resin while exhibiting swelling-inducing action with respect to the rubbery component, and subjecting the resulting film to conditions such that the above mentioned two actions with respect to the film of the solvent adhering thereto stop.

The nature, principle, and utility of the invention will be more clearly apparent from the following detailed description, beginning with a consideration of the general aspects and features of the invention and concluding with specific examples of practice illustrating preferred embodiments of the invention.

BRIEF DESCRIPTION OF THE ILLUSTRATIONS

In the illustrations:

FIG. 1 is a graphical representation indicating the effect of drawing factor on the opacity of synthetic paper products.

Figure 2A:
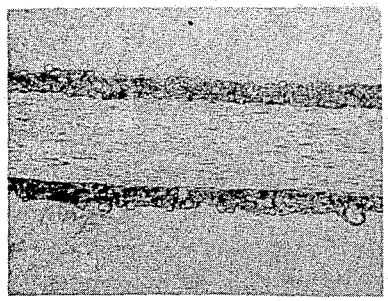
Figure 2B:
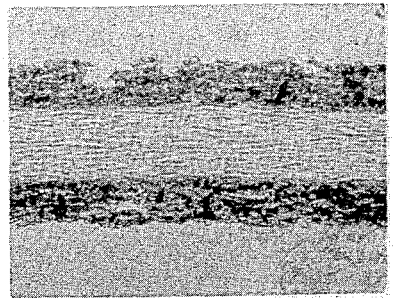
Figure 2C:
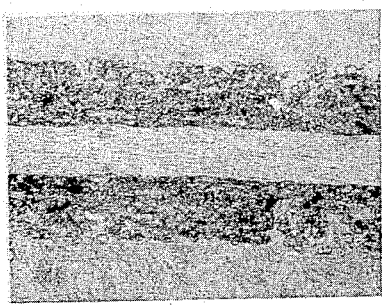
Figure 2D:
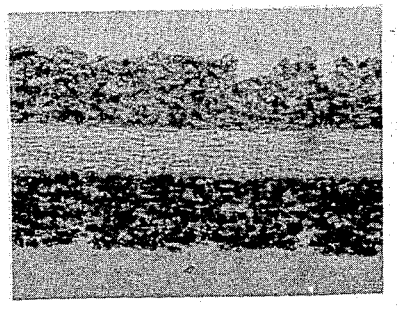
Figure 3:
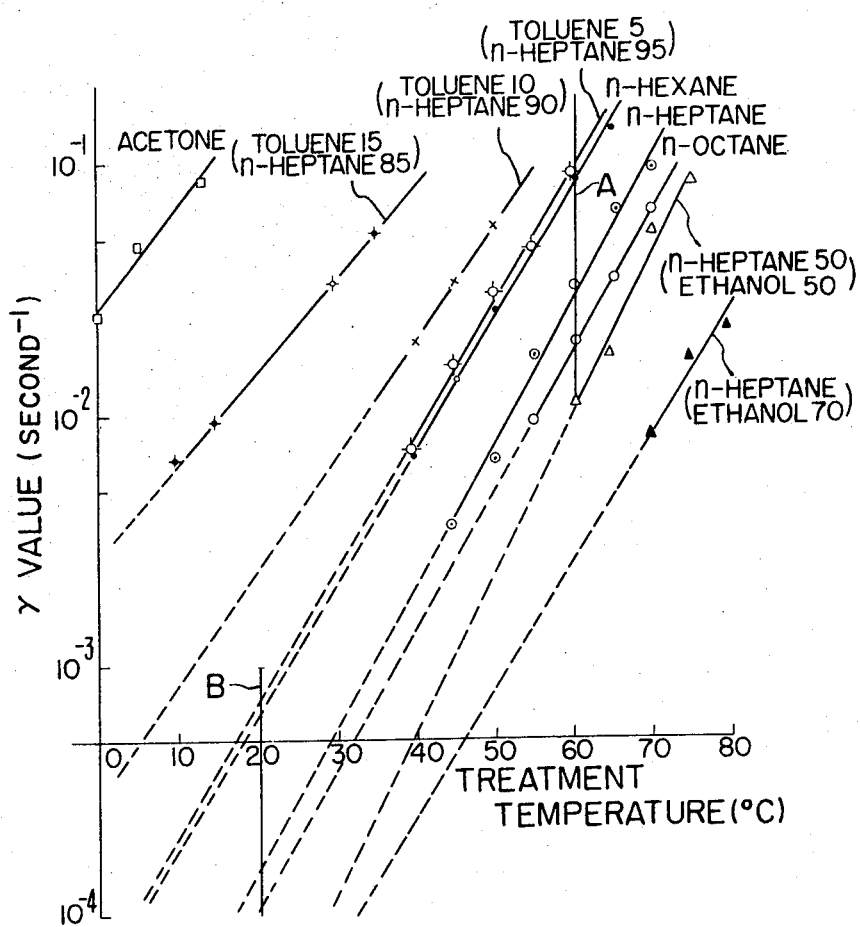

FIG. 2(a) through 2(d) are electron-microscope photographs (magnification: ×250) of a cross section of a polystyrene drawn film of solution-treated, impact-resistant character and indicate the effect of treatment time; and FIG. 3 is a graphical representation indicating the temperature dependency of the $\gamma$ value as described hereinafter.

DETAILED DESCRIPTION

As mentioned hereinbefore, this invention involves a combination of a number of essential requirements, each of which has a significant effect on the resulting product. More specifically, when a drawn film comprising a polystyrene resin containing minute particles of a rubbery component (for example, a biaxially-drawn film of a polystyrene of high impact strength (HIPS) is treated with the aforementioned solvent, the polystyrene resin part partially dissolves, and, at the same time, the rubbery component which has been deformed in the drawing directions is subjected to the swelling action and returns to its original configuration.

Then, when the condition for stopping the swelling action of the adhering solvent is applied to this film, the polystyrene resin which has been in a dissolved state precipitates out. At the same time, the deformation and swelling phenomena of the rubbery component particles, are stopped, and an increase in the thickness of the film of the rubbery component in the thickness direction thereof due to swelling occurs together with the formation of a rough outer surface on the film. If the drawing factor is sufficiently large in this case, for example, if it is of the order of at least 6 times, the shape-recovery effect of the rubbery component particles due to the solvent treatment is remarkable, whereby the following features are exhibited.

(1) High degree of whiteness or high opacity.
(2) High adhesive strength of whitened layer.
(3) Large ink-receiving capacity and high ink-drying property due to formation of continuous voids.

According to our findings, in a process wherein, by a solvent treatment of the objective film, the dissolving or swelling of the surface is carried out, the swelling action of the solvent applied to the film must be removed immediately after the treatment. For this purpose, it is necessary to remove promptly from the film the solvent which has infiltrated into the film during the treatment.

From the viewpoint of measures for stopping the action of the solvent with respect to the film, the practice of this invention may be classified into two modes of practice, namely, the solvent-removal method and the cooling method. The invention will now be described with respect to these two methods.

Solvent-removal method

The most representative measure among those for removal of a solvent adhering to the film and exhibiting action with respect thereto is that of removing this solvent out and away from the film.

For removal of a solvent contained in a film the measures of evaporation and extraction of the solvent can be considered. When the entire process of producing a papery film is considered, the former measure is a single-bath process, while the latter measure is a two-bath process. However, fully satisfactory results cannot be obtained by the former process.

More specifically, when, in the single-bath process, the evaporation is promoted by heating, the action of the solvent with respect to the film is intensified by the heat, even though this effect may be temporary, whereby the object of removing the solvent and stopping its action relative to the film is not fully achieved. Even if it were possible to achieve this object fully, control of accurate and strict operational conditions would undoubtedly be required. While the application of reduced pressure for promoting evaporation of the solvent appears to be feasible, it cannot be said to be an industrially desirable measure.

Therefore, among the possible methods of removing the adhering solvent, the method of extracting the adhering solvent (hereinafter referred to as the first solvent) with a second solvent (two-bath process) is apparently the most practical.

Accordingly, the production of papery films in accordance with this invention by this mode of practice comprises biaxially drawing, with a drawing factor of at least 6, a film comprising a polystyrene resin in which minute particles of a rubbery component have been dispersed, treating this film thus drawn with a solvent exhibiting dissolving action with respect to the polystyrene resin and exhibiting swelling action with respect to the rubbery component, and treating the resulting film with a second solvent which is a non-solvent relative to the polystyrene resin and the rubbery component and, moreover, is miscible at least partially with the first solvent thereby to stop the actions of the first solvent with respect to the film.

(I) Basic film.—As mentioned hereinabove, the film used in this invention is a polystyrene resin in which minute particles of a rubbery substance has been dispersed. While it is possible to use various elastomers for this rubbery component, the most representative are conjugate diene polymers as, for example, polybutadienes and poly (butadiene/styrene)s of desired gel contents. We have found that a particle size of this component of the order of from 0.1 to 10 microns produces satisfactory results. The particles of the rubbery component may be graft bonded with polystyrene on the surface thereof as, for example, an ABS resin.

For the polystyrene resin constituting a matrix, styrene homopolymers and copolymers predominantly of, that is, styrene, and derivatives wherein the nucleus and (or) side chain is substituted as, for example, $\alpha$-methylstyrene and vinyltoluenes, are suitable. Such modified polystyrene resins are available on the market as "impact-resistant polystyrene resins" or "high-impact polystyrene resins" or as ABS resins.

These modified polystyrene resins may contain, in addition to stabilizers and other auxiliary ingredients, a filler such as fine inorganic powder. Furthermore, the high-impact polystyrene resins may be in the form of blends with other resins, which "blends" must, of course, have the property of being formable into films. The content of the high-impact polystyrene within each blend, moreover, is preferably at least 50 percent by weight.

These high-impact polystyrene resins are biaxially drawn, and the drawing factor, moreover, is at least 6. The term "drawing factor" is herein used to designate the product of the longitudinal elongation and the transverse elongation. The upper limit of this drawing factor is determined by the drawing technique and the capability of the polystyrene resin to withstand drawing. The effect of this drawing is remarkable. When the resin is in the undrawn state, the whitening effect, even by solvent treatment, is insufficient, whereby an opacity of an order of merely that of paraffin waxed paper is obtained.

(II) Treatment with the first solvent in the two solvent baths process.—The first solvent used for treating the drawn film has dissolving capability with respect to the polystyrene forming a matrix and exhibits at least a swelling action with respect to the rubbery component in dispersed phase. This first solvent may be of a single kind or may be a mixture of solvents.

Examples of solvents having these actions are: aromatic hydrocarbons such as benzene, toluene, and xylene; ketones such as methylethyl ketone and acetone; ethers such as tetrahydrofuran, diethyl ether, and dioxane; esters such as methyl acetate, ethyl acetate, amyl acetate (n, iso), and methyl formate; hydrocarbon halogenides such as methylene chloride, chloroform, carbon tetrachloride, trichloroethylene (ethylene trichloride), ethylene tetrachloride, ethylene dichloride, ethane tetrachloride, and monochlorobenzene; and others such as carbon disulfide.

A solvent or diluent which, by itself, does not exhibit the above described actions, examples of which are aliphatic hydrocarbons such as n-heptane and n-hexane, alcohols such as methanol, ethanol, isopropanol, and methyl Cellosolve, and others such as cyclohexane, can be used together with the above described first solvent for purposes such as adjusting the action thereof.

The treatment with this first solvent is carried out under conditions which are amply sufficient for attaining the desired actions. More specifically, the treatment is carried out, for example, at a temperature of from 0 to 40 degrees C. for a period of the order of 60 seconds or less. The higher the treatment temperature is, the shorter is the required treatment time. The most practical treatment procedure is immersing the film in a bath of the solvent.

(III) Treatment with the second solvent in the two solvent baths process.—The second solvent used in treating the film thus treated with the first solvent is a solvent which is a non-solvent with respect to the polystyrene resin and the rubbery component and is miscible at least partially with the first solvent. More specifically, the aforementioned solvents or diluents which are usable together with the first solvent can be used as this second solvent. Since the purpose of the second solvent is principally to stop the actions of the first solvent, the conditions of the treatment with this second solvent (i.e., quantity of the solvent and treatment temperature and time) are determined with this purpose in view.

After treatment with the second solvent, the adhering solvent is removed by a measure such as evaporation, whereupon a paper, film is obtained.

The terms dissolving action or capability, swelling action or swelling-inducing action, and non-solvent are herein used in a relative sense and should be interpreted to be determined by the given conditions. Accordingly, a solvent exhibiting dissolving capability under certain conditions may become a swelling agent or a non-solvent under other conditions.

Cooling method in single bath process

In this method the temperature dependency of a solvent action is utilized. This method is practiced using a single-bath process wherein the swelling action of the solvent applied onto the film is removed by utilizing the temperature dependency (variation of the value of $\gamma$) of the swelling action of the solvent (for example, n-heptane). Therefore, this method is not accompanied by the difficulties encountered in the heating removal in the conventional single-bath process and the difficulties encountered in the two-bath process.

In most cases in the practice of this method according to the invention, the treatment temperature is of the order of from 60 to 70 degrees C., and the cooling temperature is of the order of room temperature. Therefore, this method is superior to the known single-bath method also on the point of required energy. With a treatment temperature of this order, moreover, it is possible to carry out a squeeze-roll process step immediately after the solvent treatment, which step was not possible in the conventional single-bath process.

Accordingly, when a film treated in the above described manner is subjected to a squeeze-roll process step immediately after the solvent treatment or after cooling, the rate of solvent recovery is increased, and, moreover, the treated film thereafter can be made into a product by merely air drying. Furthermore, the opacity of the product thus obtained is not lowered, and the smoothness of the product is improved because of the use of mirror-surface squeeze rolls. Still another advantageous feature of this method is that the opacity of the film can be readily increased by a short treatment.

Accordingly, the process of producing paperlike films in accordance with this invention is characterized by the steps of preparing a drawn film comprising a polystyrene resin in which fine particles of a rubbery component has been dispersed, treating this film with a solvent as described below at a temperature above 30 degrees C. but below the temperature at which the film deforms greatly thereby to render at least the film surface into a swollen state, and cooling this film thus treated to a temperature below the above stated treatment temperature and, moreover, below 40 degrees C. thereby to stop substantially the swelling action of the abovementioned solvent.

Solvent in the single bath process (1) This is a solvent whereby the $\gamma$ value satisfies the following equation when the solvent is caused to contact the film being treated, thereby causing the film surface to assume a swollen state.

$$f = f_0 e^{-\gamma t}$$

where:

$F_0$ is the film thickness (microns) prior to contact;
$f$ is the thickness (microns) of the remaining unswollen layer of the film after contact;
$t$ is the treatment time (seconds); and
$\gamma$ is a constant determined by the solvent and the treatment temperature.

(2) The solvent is such that the $\gamma$ value at the above mentioned treatment temperature is $10^{-2}$ or higher, and, moreover, the $\gamma$ value at the above mentioned cooling temperature is $10^{-3}$ or lower.

(I) Basic film.—The basic film is substantially the same as that used in the aforedescribed two-bath process. While the lower limit of the drawing factor is not necessarily 6, it is preferable that the drawing factor be above 6.

(II) Solvent.—The solvent for use in treating the drawn film of high-impact polystyrene resin to render at least the surface thereof into a swollen state is such that the $\gamma$ value is definable by the following equation and which $10^{-2}$ or higher at the treatment temperature and $10^{-3}$ or lower at the cooling temperature.

$$f = f_0 e^{-\gamma t}$$

(wherein the symbols are as already defined above).

This $\gamma$ value, as is apparent from its definition, represents the actions of a given solvent relating to dissolving and swelling of the polystyrene resin part. Even in the case of different solvents, if the $\gamma$ values at a certain temperature are the same, the actions of these solvents at that temperature with respect to the polystyrene resin and the particles of the rubbery component will be the same. Therefore, it is possible to prescribe the solvents which can be used by this $\gamma$ value.

More specifically, when this $\gamma$ value is $10^{-3}$ or less, the actions of the solvent at the temperature thereof with respect to the film virtually stop. Accordingly, a solvent for use according to the invention must be such that the $\gamma$ value is $10^{-3}$ or less at the cooling temperature (e.g., room temperature) at which the action of the solvent is to be stopped. On the other hand, at the treatment temperature for causing swelling of the film surface, the $\gamma$ value must be $10^{-2}$ or higher in order to cause the action of the solvent to be fully exhibited.

That is, for example, in the case of a mixture solvent of 15 percent of toluene and 85 percent of n-heptane (percentages by volume), the $\gamma$ value does not become $10^{-3}$ or less in the vicinity of room temperature. Consequently, the dissolving of the polystyrene and the swelling of the rubbery component particles progress as long as the solvent contained within the film is not moved. However, the $\gamma$ values in the case of a mixture solvent of 5 percent of toluene and 95 percent of n-heptane and single solvents n-hexane, n-heptane, and n-octane become $10^{-3}$ or less in the neighborhood of room temperature. Therefore, by cooling the film to a temperature in the neighborhood of room temperature, the dissolving and swelling actions can be brought to almost a complete stop even when the solvent contained within the film is not removed.

Thus, this $\gamma$ value can be utilized as an evaluation standard for judging the possibility of using a given solvent. The equation set forth hereinbefore for calculating this $\gamma$ value involves the following technical features and considerations.

When a drawn film of a high-impact polystyrene resin of a thickness of $f_0$ (microns) is treated at a certain temperature with a given solvent, the surface thereof swells after $t$ seconds, leaving an unswollen part of a thickness $f$ (microns). After air drying, the film thus treated is fixed with paraffin and cut with a microtome, and the resulting section is examined under a microscope, whereupon structures as shown in FIGS. 2(a) through 2(d) are observable.

FIGS. 2(a) through 2(d) respectively show the section after 5, 10, 15, and 20 seconds when a drawn film of a high-impact polystyrene resin (made by Mitsubishi Monsanto Kasei Sha, Japan, having a thickness of 75 microns, a drawing factor (area) of approximately 8 times, and a polybutadiene content of from 4 to 6 percent) was treated with n-heptane at 60 degrees C. While the interfaces between the central unswollen layers and swollen layers are not always smooth and even, the effect of the accuracy of measurement of the $f_0$ value on the $\gamma$ value is, in general, within the range of allowable error.

The equation set forth hereinbefore is valid for a given solvent, in general, within limits wherein a great shrinkage of the film is not observable, irrespective of the treatment temperature and time. However, in the measurement of the $\gamma$ values used in the practice of the invention, favorable conditions are $f_0 = 75$ microns and $f = 10$ microns, both approximately with respect to a biaxially drawn film (M.I.=0.82, drawing factor (longitudinal × transverse) of the order of 8 times) of an impact-resistant polystyrene [poly (polybutadiene/styrene)] of a polybutadiene content of the order of from 4 to 6 percent by weight and a polybutadiene particle size of the order of 6 microns.

As mentioned above, this $\gamma$ value varies with temperature, as indicated in FIG. 3 showing the variations of $\gamma$ value with temperature for various solvents. From this graph, furthermore, we have found that the relationship between the $\gamma$ value and temperature can be expressed by the following equation.

$$\gamma = \gamma_0 e^{aT}$$

where:

$\gamma$ is the $\gamma$ value at T (° C.);
$\gamma_0$ is the $\gamma$ value at 0 (° C.);
T is the treatment temperature (° C.); and
$a$ is the rate of variation of $\gamma$ with temperature and $e$ is a constant determined by the kind of solvent.

Solvents conforming to this definition may be used singly or as mixture of a plurality thereof which result in the desired $\gamma$ values. Since the treatment temperature for causing swelling of the film surface and the cooling temperature for stopping the swelling are relative quantities, it is possible to select the solvent to be used after these temperatures have been determined. Accordingly, when FIG. 3 is referred to, and it is assumed that the treatment temperature is set at 60 degrees C. and the cooling temperature at 20 degrees C., for example, the solvents (five solvents in FIG. 3) whose $\gamma$-temperature lines intersect both isothermic coordinates A and B through 60 and 20 degrees C. can be used.

Furthermore, when there is a special requirement for the use of a mixture solvent such that the $\gamma$ value at a temperature in vicinity of room temperature will not be lower than $10^{-3}$ (15 percent of toluene plus 85 percent of n-heptane), the $\gamma$-temperature lines in FIG. 3 can be extended as extrapolations to determine the temperature at which the $\gamma$ value becomes $10^{-3}$, and then —15 degrees C. and lower temperatures can be selected as cooling temperatures.

(III) Operation 1.—The treating and cooling of the film can be carried out under any conditions and by any method which will make possible swelling of the film surface and stopping of the swelling. In general, the treatment time is within 60 seconds, being ordinarily of the order of from a few seconds to 20 seconds. In some cases, however, depending on the treatment temperature and (or) the desired degree of swelling, a longer time may be required.

While it is possible to carry out the swelling process to an extent whereby no unswollen layer remains within the film, it is preferable, in general, to carry out this process in a manner to cause an unswollen layer to remain at the central part of the film so that the film after treatment will have a certain degree of strength, and so that the film will not shrink excessively.

In correspondence with the relative shortness of the treatment time as described above, the ordinary treatment procedure is to pass the film through a solvent bath maintained at a specific temperature or to pass the film through a solvent bath at room temperature and then pass the film with the solvent adhering thereto through a heating chamber. The treatment temperature is 30 degrees C. or higher, preferably 40 degrees or higher, up to an upper limit which is that temperature at which the film undergoes considerable deformation under the treatment conditions.

The cooling of the film is ordinarily accomplished by passing the film through a cooling chamber or causing it to contact one or more cooling rolls. The cooling temperature is 40 degrees C. or lower, preferably 30 degrees C., or lower. It is also desirable to accomplish the cooling without cooling the film to a temperature below zero degrees C. Except in the case where a solvent of a sufficiently small $\gamma$ value at the cooling temperature is used, it is preferable that the solvent adhering to or contained within the film be removed as soon as possible after cooling. Prompt removal of the solvent is desirable also from the viewpoint of production process speed. Solvent removal can be accomplished by means of squeeze rolls and (or) by air drying.

As mentioned hereinbefore, a feature of the process of this invention is that the film after solvent treatment can be passed, with the solvent used still adhering thereto or contained therein, between squeeze rolls thereby to remove the solvent. If the squeeze rolls are intended merely to remove the solvent, they may be rubber rolls. If improvement of the smoothness of the film surface is desired, hard rolls of smooth surface such as mirror-finished rolls should be used.

The squeeze-roll process step can be carried out immediately after the solvent treatment. In this case, however, the surface temperature of the squeeze rolls should be maintained below the temperature at which the $\gamma$ value of the solvent used becomes $10^{-3}$ or lower. If the roll surface is at a temperature such as to raise the $\gamma$ value of the solvent used above $10^{-2}$, there will be the possibility of impairment of the transparency of the product film. After squeezing, the quantity of adhering or contained solvent is small, whereby the film can be heated and dried.

(IV) Operation 2.—In the case where the treatment solvent is immiscible with respect to water (many of the solvents usable in accordance with this invention being water immiscible), and the temperature of the treatment with this solvent is below the boiling point of water, the aforementioned "heating chamber" may be a water bath.

More specifically, when a film with a solvent which is oleophilic and not hydrophilic adhering thereto is immersed for a specific treatment time in a water bath maintained at a specific treatment temperature, the solvent remains adhering to the film and is not scattered into the water bath, as is confirmable in actual practice. Therefore, the intended solvent treatment can be carried out in the water bath. The "water bath," in addition to being pure water, may be water containing various water-soluble substances, such as inorganic salts, which do not promote the dissolution of the solvent.

While the fundamental mechanism of the whitening of the film is essentially the same as that of the aforedescribed solution method, a remarkable and important feature of this process is that the use of an excessive quantity of the solvent is not necessary, and, moreover, since the reaction of the solvent adhering to the film occurs in a warm-water system, the quantity of solvent evaporated off is limited. Accordingly, when industrialized, this process becomes a very easy and safe process.

That is, the following advantages are attained by this mode of practice.

(1) Since this is an underwater treatment, there is no evaporating of the solvent off the film surface, whereby an extremely small quantity of solvent adhering to the film surface is sufficient.

(2) Since the minimum quantity of the solvent necessary for whitening can be caused to adhere to the film according to the invention, unnecessary solution of the film surface can be avoided. In contrast, in a treatment process outside of a water bath, the solvent tends to adhere in an amount exceeding the necessary quantity, whereby the film surface is apt to be unnecessarily dissolved in the whitening process.

(3) Since the boiling point of water is higher than that of the solvent, in general, and temperature control is possible up to the vicinity of the boiling point, the whitening process can be accomplished in a short time. Furthermore, since the temperature of the solvent is controlled in water, evaporating off of the solvent as vapor is restricted, whereby the degree of safety is high.

(4) The quality of the product is of the same order as or higher than that in the case where treatment is carried out outside of a water bath.

(5) The quantity of solvent contained on or within the film is relatively small, and the removal thereof and drying of the film can be accomplished easily and in a simple manner, whereby an excessively large and expensive apparatus is not necessary for solvent recovery.

(6) In correspondence with the small quantity of adhering solvent required and the small quantity of solvent lost by evaporation during the treatment process, the process step of causing the solvent to adhere to the film is extremely simple. For example, the solvent can be applied on the film by means of a roll coater of by causing the solvent to float on the entire surface or a part thereof of a water bath and introducing the film into the water bath through the floating solvent layer.

In order to indicate still more fully the nature and utility of this invention, the following specific examples of practice representing preferred embodiments of the invention and results are set forth, it being understood that these examples are presented as illustrative only, and that they are not intended to limit the scope of the invention.

EXAMPLE 1

HI/PS (impact-resistant polystyrene), undrawn film stock containing approximately 92 percent of styrene and 8 percent of butadiene and having a thickness of 350 microns (produced by Mitsubishi Monsanto Kasei Sha, Japan) was biaxially drawn in a continuous manner at a drawing speed of 110 cm./second, at a drawing temperature of 120 degrees C., and with different drawing factors of from 4 to 14 times.

Next, the film thus drawn was treated for 5 and 10 seconds in a solvent mixture of 15 parts of monochlorobenzene and 85 parts of n-heptane at 20 degrees C. and then placed immediately in methanol. After immersion in the methanol for 30 seconds, the film was dried.

Measured results of the above described procedure are set forth in Table 1, the principal results being the film thicknesses before and after treatment with the dissolving medium (solvent+diluent), whiteness of the film after treatment, opacity, smoothness, and surface strength (IGT).

The effect of drawing factor on the opacity, which is one of the results in Table 1, of the product is indicated together with other experimental results in the accompanying FIG. 1. The critical nature of the requirement in this invention that the drawing factor be 6 or higher is quite apparent from FIG. 1. In this graph, curve 1 is for 5-second treatments and curve 2 is for 10-second treatments with the solvent.

The various quantities indicated were measured by the following methods.

Whiteness: Japan Industrial Standards, JIS P8123—Method of testing whiteness of paper.
Opacity: JIS P8138—Method of testing opacity of paper.
Smoothness: By means of Ohken-shiki air micro smoothness tester. The greater the planar smoothness, the higher is the numerical value.
Surface strength: IGT printing tester (Intac 20.1). The higher the surface strength, the higher is the numerical value.

EXAMPLE 2

HI/PS undrawn film stock containing approximately 92 percent of styrene and 8 percent of butadiene and having a thickness of 400 microns (produced by Mitsubishi Monsanto Kasei Sha, Japan) was biaxially drawn in a continuous manner at drawing speeds of 110, 145, and 180 cm./second, at a drawing temperature of 115 degrees C., and with different drawing factors of from 3 to 14 times.

Next, the film thus drawn was treated for 5, 10, and 15 seconds over respectively different parts thereof with a mixture solvent of 15 parts of monochlorobenzene and 85 percent of n-heptane at 20 degrees C. and then placed immediately in methanol, in which the film was immersed for 30 seconds. The film was then dried.

Measured results of the above described procedure, which were measured similarly as in Example 1 are set forth in Table 2.

TABLE 1

| Experiment Number | Drawing factor Longitudinal, x | Lateral, y | Area, times, xy | Solvent Treatment time, sec. | Film thickness, μ Before treatment | After treatment | Properties of resulting synthetic paper Whiteness, percent | Opacity percent | Smoothness, sec. | IGT, cm/sec. |
|---|---|---|---|---|---|---|---|---|---|---|
| 1 | 1.5 | 2.8 | 4.2 | 5 / 10 | 91 | 95 / 94 | 87.3 / 87.8 | 43.7 / 47.0 | 270 / 210 | >314 / >314 |
| 2 | 2.0 | 2.75 | 5.5 | 5 / 10 | 71 | 76 / 75 | 87.4 / 88.2 | 50.1 / 59.9 | 220 / 180 | >314 / >314 |
| 3 | 2.1 | 2.9 | 6.0 | 5 / 10 | 64 | 66 / 75 | 88.7 / 90.6 | 62.0 / 77.1 | 210 / 190 | >314 / >314 |
| 4 | 2.4 | 3.2 | 7.6 | 5 / 10 | 53 | 55 / 69 | 90.8 / 91.3 | 71.8 / 78.3 | 130 / 160 | >314 / >314 |
| 5 | 2.8 | 3.3 | 9.2 | 5 / 10 | 43 | 51 / 65 | 90.8 / 91.3 | 71.8 / 80.0 | 140 / 130 | >314 / >314 |
| 6 | 3.7 | 3.7 | 13.9 | 5 / 10 | 27 | 49 / 51 | 91.5 / 91.2 | 73.6 / 80.0 | 70 / 60 | >314 / >314 |

TABLE 2

| Sample Drawing speed, cm./min. | Drawing factor [1] | Solvent treatment time (sec.) | Film thickness, μ Before treatment | After treatment | Properties of resulting synthetic paper Whiteness, percent | Opacity, percent | Smoothness, sec. | IGT, cm./sec. |
|---|---|---|---|---|---|---|---|---|
| 110 | (3.5)[2] | 5 | 40 | 59 | 92.0 | 80.7 | 67 | 192 |
| 110 | (2.8)[2] | 10 | 57 | 83 | 90.0 | 83.1 | 92 | 270 |
|  | (2.8)[2] | 15 | 57 | 92 | 89.9 | 89.1 | 75 | 275 |
| 145 | (2.8)[2] | 10 | 55 | 80 | 92.4 | 85.4 | 80 | 181 |
|  | (2.8)[2] | 15 | 55 | 97 | 93.0 | 88.5 | 97 | 268 |
| 180 | (2.8)[2] | 10 | 48 | 75 | 92.3 | 84.2 | 75 | 226 |
|  | (2.8)[2] | 15 | 48 | 85 | 92.5 | 87.9 | 85 | 250 |
| 110 | (2.6)[2] | 10 | 49 | 86 | 93.1 | 88.4 | 86 | --- |
|  | (2.6)[2] | 15 | 49 | 82 | 90.5 | 86.9 | 70 | 217 |
| 145 | (2.6)[2] | 10 | 50 | 75 | 88.6 | 79.7 | 107 | 264 |
|  | (2.6)[2] | 15 | 49 | 75 | 92.4 | 80.8 | 75 | 234 |
| 180 | (2.6)[2] | 10 | 54 | 62 | 91.6 | 79.0 | 62 | 256 |
|  | (2.6)[2] | 15 | 54 | 74 | 91.0 | 85.7 | 74 | >324 |
| 110 | (2.1)[2] | 10 | 67 | 74 | 91.0 | 70.9 | 74 | >324 |
|  | (2.1)[2] | 15 | 67 | 75 | 91.3 | 78.8 | 75 | >324 |
| 145 | (2.1)[2] | 10 | 60 | 71 | 91.0 | 70.9 | 71 | >329 |
|  | (2.1)[2] | 15 | 60 | 71 | 91.0 | 79.6 | 71 | >329 |
| 180 | (2.1)[2] | 10 | 58 | 72 | 91.8 | 76.6 | 72 | 329 |
|  | (2.1)[2] | 15 | 58 | 71 | 91.0 | 75.1 | 71 | >329 |

[1] Drawing factor is the product of the linear drawing factors in the longitudinal and transverse directions.

For reference purposes, a film stock of a thickness of 250 microns was drawn with drawing factors of $(2.1)^2$ and $(1.8)^2$ times and solvent treated. However, the resulting films could not be whitened even when the solvent dilution rate and treatment time were varied.

EXAMPLE 3

HI/PS, biaxially-drawn film containing 92 percent of styrene and 8 percent of butadiene, drawn with a drawing factor of from 6 to 7, and having a thickness of 75 microns (produced by Mitsubishi Monsanto Kasei Sha, Japan) was treated for different times and at different treatment temperatures in a mixture solvent of 15 parts of monochlorobenzene and 85 percent of n-heptane and then placed immediately in methanol. After 30 seconds of immersion, the film was dried.

The process conditions and results, including the properties of the synthetic papers thus produced are set forth in Table 3.

EXAMPLE 4

The same drawn film as that specified in Example 3 was treated for varying times with various dissolving mediums (solvent+diluent), at 20 degrees C., treated in a nonsolvent for 30 seconds, and then dried.

The process conditions and results are set forth in Table 4.

EXAMPLE 5

(1) HI/PS, biaxially-drawn film containing from 94 to 96 percent of styrene and from 6 to 4 percent of butadiene, drawn with a drawing factor (longitudinal × transversal) of approximately 8 times, and having a melt index (M.I.) of 0.82 (produced by Mitsubishi Monsanto Kasei Sha, Japan) was immersed for 5 seconds in n-heptane heated to 65 degrees C., then taken out of the n-heptane bath, and passed through and between nip or squeeze rolls made of rubber to squeeze off the solvent, n-heptane, adhering to the film surface. The film thus treated was then air dried at room temperature, whereupon an opaque film was obtained.

The film thus produced was found to have an opacity of 88.2 percent, a smoothness of 63 seconds, and an IGT surface strength of 230 cm./min.

(2) HI/PS, biaxially-drawn film was immersed for 10 seconds in n-heptane heated to 50 degrees C. and then subjected to squeezing and air drying at room temperature by the procedure set forth in Example 5–(1), whereupon an opaque film was obtained.

The film thus produced has an opacity of 81.7 percent, a smoothness of 122 seconds, and an IGT surface strength of 140 cm./min.

TABLE 4

| Experiment No. | Treatment conditions | | | | | Properties of resulting synthetic paper | | | | |
|---|---|---|---|---|---|---|---|---|---|---|
| | Solvent | Diluent | Diluent proportion,[1] percent | Nonsolvent | Solvent medium treatment time, sec. | Film thickness after treatment $\mu$ | Whiteness, percent | Opacity, percent | Smoothness, sec. | IGT, cm./sec. |
| 1 | Methyethyl ketone | Ethanol | 42.5 | n-Heptane | 20 | 160 | 92.9 | 85.4 | 12 | >314 |
| 2 | Dioxane | n-Heptane | 85.0 | Methanol | 30 | 120 | 93.2 | 86.0 | 35 | >315 |
| 3 | Ethyl acetate | Isopropanol | 50.0 | do | 30 | 106 | 91.4 | 79.4 | 58 | >314 |
| 4 | Tetrahydrofuran | n-Heptane | 82.5 | n-Heptane | 15 | 101 | 92.1 | 82.7 | 480 | 155 |
| 5 | Benzene | Methyl Cellosolve | 70 | do | 15 | 143 | 91.9 | 79.5 | 9 | >314 |
| 6 | Carbon disulfide | n-Hexane | 90.0 | n-Hexane | 10 | 95 | 89.7 | 81.2 | 185 | 119 |

[1] Diluent proportion = $\dfrac{\text{Diluent (volume)}}{\text{Solvent (volume) + Diluent (volume)}} \times 100$ Other synthetic papers were similarly produced under various process conditions and were found to have the properties set forth in Table 5. The results shown therein for opacity, smoothness, and surface strength were measured in accordance with the standard specifications set forth hereinbefore.

EXAMPLE 6

(1) HI/PS, biaxially-drawn film was immersed for 15 seconds in a bath of n-heptane heated to 60 degrees C., then taken out of the bath, and, after cooling to 20 degrees C., was squeezed with a nip pressure of 6.56 kg./cm. between mirror-finished metal rolls. The film thus squeezed was air dried at room temperature, whereupon an opaque film was obtained.

The squeeze rate, of the following definition, was 71.4 percent.

$$\text{Squeeze rate} = \dfrac{\text{(Weight of solvent squeezed out)}}{\text{(Weight of adhering solvent)}} \times 100$$

The resulting opaque film was found to have an opacity of 88.0 percent, a smoothness of 215 seconds, and an IGT surface strength of 110 cm./sec.

(2) HI/PS, biaxially drawn film was immersed for 10 seconds in a bath of n-hexane heated to 50 degrees C., then taken out of the bath, and after cooling to 20 degrees C., was squeezed with a nip pressure of 4.37 kg./cm. between mirror-finish metal rolls. The film thus squeezed was air dried at room temperature, whereupon an opaque film was obtained.

The squeeze rate was 72.0 percent, and the resulting opaque film had an opacity of 81.7 percent, a smoothness of 300 seconds, and an IGT surface strength of 140 cm./sec.

TABLE 3

| Experiment number | Solvent treatment conditions | | Film thickness after treatment, $\mu$ | Properties of resulting synthetic paper | | | |
|---|---|---|---|---|---|---|---|
| | Temp.,° C. | Time, sec | | Whiteness, percent | Opacity, percent | Smoothness, sec. | IGT, cm./sec. |
| 1 | 15 | 30 | 104 | 92.2 | 77.1 | 85 | 274 |
| 2 | 25 | 15 | 113 | 92.5 | 77.4 | 67 | >314 |
| 3 | 40 | 5 | 150 | 90.8 | 87.5 | 7 | >314 |

TABLE 5

| Solvent used | Treatment Temp., °C. | Time, sec. | Film thickness after Treatment, μ | Properties of resulting synthetic paper Opacity, percent | Smoothness, sec. | IGT cm./sec. |
|---|---|---|---|---|---|---|
| n-Hexane | 50 | 5 | 92 | 70.7 | 55 | 80 |
|  | 50 | 10 | 103 | 81.7 | 122 | 140 |
|  | 50 | 20 | 143 | 92.5 | 47 | 210 |
|  | 60 | 3 | 110 | 81.2 | 82 | 125 |
|  | 60 | 5 | 120 | 85.3 | 62 | >230 |
|  | 60 | 10 | 148 | 89.8 | 33 | >230 |
| n-Heptane | 50 | 10 | 82 | 52.5 | 310 | 80 |
|  | 50 | 20 | 86 | 70.0 | 225 | 110 |
|  | 50 | 30 | 104 | 82.5 | 152 | 145 |
|  | 50 | 60 | 134 | 92.0 | 66 | 160 |
|  | 60 | 10 | 112 | 86.9 | 94 | 180 |
|  | 60 | 15 | 132 | 90.7 | 70 | 222 |
|  | 60 | 20 | 146 | 91.4 | 50 | >230 |
|  | 70 | 2 | 113 | 81.2 | 53 | >230 |
|  | 70 | 3 | 120 | 83.0 | 35 | >230 |
|  | 70 | 5 | 144 | 88.5 | 23 | >230 |
| n-Octane | 50 | 20 | 82 | 44.1 | 380 | 65 |
|  | 50 | 30 | 84 | 56.7 | 280 | 90 |
|  | 50 | 60 | 97 | 77.2 | 220 | 120 |
|  | 60 | 5 | 88 | 61.4 | 230 | 80 |
|  | 60 | 10 | 95 | 75.7 | 180 | 110 |
|  | 60 | 20 | 118 | 88.8 | 84 | 175 |
|  | 60 | 30 | 146 | 93.4 | 50 | 225 |

(3) HI/PS, biaxially-drawn film was immersed for 15 seconds in a bath of a composite solvent of 90 parts of n-heptane and 10 parts of toluene heated to 40 degrees C., then taken out of the bath, and, after cooling to 5 degrees C., was squeezed with a nip pressure of 2.18 kg./cm. between mirror-finish metal rolls. The film thus squeezed was air dried at room temperature, whereupon an opaque film was obtained.

The squeeze rate was 48.0 percent, and the opaque thus obtained had an opacity of 88.4 percent, a smoothness of 172 seconds, and an IGT surface strength of 215 cm./sec.

EXAMPLE 7

(1) Ecect of pressure of squeeze rolls

HI/PS, biaxially-drawn film of 75-micron thickness (produced by Mitsubishi Monsanto Kasei Sha, Japan) was treated with n-heptane heated to 60 degrees C., cooled to room temperature, and then squeezed between mirror-finish squeeze rolls at 20 degrees C. The varying values of solvent-treatment time, nip pressure, the quantity of adhering solvent, and squeeze rate in this process and the properties of the resulting films are set forth in Table 6, whereby the relationships therebetween are indicated.

It is observable from this Table 6 that, under swelling treatment conditions such as to produce an opacity of 80 percent or higher, there is almost no lowering of the opacity and the smoothness is improved when the squeeze rate is increased up to 80 percent with a nip pressure of from 4 to 8 kg./cm. Furthermore, the printing surface reflection factor or reflectivity and the luster of the printing surface are improved.

(2) Effect of squeeze roll temperature

HI/PS, biaxially-drawn film of 75-micron thickness (produced by Mitsubishi Monsanto Kasei Sha, Japan) was treated for 15 seconds with n-heptane heated to 60 degrees C., cooled to room temperature, and then squeezed with varied nip pressure between mirror-finish squeeze rolls at varied temperatures from 17 to 53 degrees C. The relationships between the squeeze-roll temperature and the opacity of the resulting film at the varied nip pressures are indicated in Table 7.

From these results, it is apparent that, when the squeeze-roll temperature exceeds 30 degrees C., there is a great lowering of the opacity, which tendency increases with this roll temperature, but in the vicinity of 20 degrees C., there is almost no variation of the opacity even when the film is squeezed with a nip pressure of from 2.18 to 8.73 kg./cm.

That is, it is apparent from FIG. 3 that when the $\gamma$ value is less than $5 \times 10^{-4}$, the swelling is stopped (the $\gamma$ value being $5 \times 10^{-14}$ at approximately 30 degrees C. in the case of n-heptane). With a solvent composition having swelling-inducing capability with respect to HI/PS at a temperature in the vicinity of room temperature, the $\gamma$ value is not lowered below $5 \times 10^{-4}$ at temperatures above zero (0) degrees C., whereby squeezing causes a large lowering of the film opacity.

TABLE 6

| Treatment time sec. | Cylinder pressure, kg./cm.² | Line pressure, kg./cm. | Quantity of adhering liquid, g./cm.² | Squeeze rate, percent | Thickness, μ Total | Film layer | Paper-like layer | Properties of resulting synthetic paper Opacity, percent | Smoothness, sec. | IGT, cm./sec. |
|---|---|---|---|---|---|---|---|---|---|---|
| 5 | 0 | 0 | 31.4 | 0 | 89 |  | 28 | 76.3 | 155 | >324 |
|  | 1 | 2.18 | 6.1 | 80.6 | 88 |  | 26 | 73.5 | 255 | >324 |
|  | 2 | 4.37 | 4.7 | 85.0 | 84 | 61 | 22 | 71.1 | 420 | >324 |
|  | 3 | 6.56 | 3.0 | 90.5 | 82 |  | 20 | 70.1 | 660 | >324 |
|  | 4 | 8.73 | 3.6 | 88.6 | 76 |  | 16 | 63.3 | 750 | 280 |
| 10 | 0 | 0 | 44.2 | 0 | 103 |  | 50 | 85.0 | 108 | 310 |
|  | 1 | 2.18 | 16.3 | 63.2 | 99 |  | 46 | 84.2 | 185 | 170 |
|  | 2 | 4.37 | 12.4 | 72.0 | 100 | 53 | 46 | 84.8 | 310 | 130 |
|  | 3 | 6.56 | 9.4 | 79.0 | 92 |  | 40 | 82.2 | 325 | 137 |
|  | 4 | 8.73 | 9.0 | 79.5 | 93 |  | 40 | 78.5 | 600 | 150 |
| 15 | 0 | 0 | 60.3 | 0 | 123 |  | 80 | 91.1 | 64 | >324 |
|  | 1 | 2.18 | 31.3 | 48.1 | 113 |  | 70 | 88.2 | 150 | 215 |
|  | 2 | 4.37 | 19.4 | 40.9 | 111 | 43 | 68 | 90.0 | 160 | 125 |
|  | 3 | 6.56 | 17.2 | 71.4 | 106 |  | 62 | 88.0 | 215 | 110 |
|  | 4 | 8.73 | 18.2 | 69.9 | 103 |  | 60 | 87.2 | 250 | 120 |
| 20 | 0 | 0 | 80.5 | 0 | 135 |  | 102 | 93.4 | 58 | >324 |
|  | 1 | 2.18 | 57.6 | 28.5 | 129 |  | 96 | 92.4 | 92 | 255 |
|  | 2 | 4.37 | 23.5 | 70.8 | 123 | 34 | 88 | 92.7 | 122 | 203 |
|  | 3 | 6.56 | 20.9 | 74.2 | 125 |  | 90 | 92.0 | 200 | 170 |
|  | 4 | 8.73 | 22.2 | 72.5 | 111 |  | 78 | 91.7 | 210 | 110 |

TABLE 7

| Nip pressure, kg./cm. | Opacity, percent | | | |
|---|---|---|---|---|
| | 2.18 | 4.37 | 6.56 | 8.73 |
| Squeeze roll temp., °C.: | | | | |
| 17 | 91.1 | 92.6 | 93.4 | 92.0 |
| 25 | 91.2 | 88.3 | 88.3 | 88.0 |
| 30 | 88.9 | 86.7 | 86.6 | 86.3 |
| 35 | 73.0 | 79.0 | 82.3 | 77.7 |
| 45 | 62.3 | 62.2 | 54.9 | 66.0 |
| 53 | 62.3 | 61.8 | 59.7 | 57.5 |

EXAMPLE 8

HI/PS, biaxially-drawn film was dipped instantaneously in n-heptane at 25 degrees C. to cause the n-heptane to adhere to the film surface. The film with adhering solvent was then immersed for 15 seconds in warm water at 60 degrees C., taken out of the water, and air dried at room temperature.

The film thus obtained had an opacity of 91.4 percent, a smoothness of 45 seconds, and an IGT surface strength of 230 cm./sec.

EXAMPLE 9

Normal hexane was caused to float on the surface of a bath of warm water at 50 degrees C. to form thereon a hexane layer of 5 mm. thickness. The same HI/PS film as that used in Example 2 was instantaneously passed through this liquid surface layer and held for 5 seconds in the warm water. The film was then taken out of the bath and dried with hot air at 70 degrees C., whereupon a translucent film resembling tracing paper was obtained.

The film was found to have an opacity of 70 degrees C., a smoothness of 55 seconds, and an IGT surface strength of 80 cm./sec.

EXAMPLE 10

A solvent mixture of 97 parts of n-heptane and 3 parts of toluene was applied by means of a roll coater on both surfaces of HI/PS, biaxially-drawn film in an quantity of 8 grams per square meter (g./m.²) on each surface. The film thus coated was then passed through a constant-temperature water bath at 57 degrees C. with an immersion time of 10 seconds and, after removal from the bath, was dried by warm air blown thereagainst.

The resulting film had an opacity of 85 percent, a smoothness of 108 seconds, and an IGT surface strength of 310 cm./sec.

EXAMPLE 11

HI/PS, biaxially-drawn film heated to 60 degrees C. was immersed for 2 seconds in a solvent mixture composed of 85 parts of n-octane and 15 parts of benzene and heated to 60 degrees C. The film was then immersed for 15 seconds in warm water at 40 degrees C. and then air dried at room temperature.

The resulting film had an opacity of 78 percent and a smoothness of 123 seconds.

EXAMPLE 12

A solvent mixture of 75 parts of n-heptane and 25 parts of toluene was caused to float on water at 25 degrees C. to form a solvent layer of 5 mm. thickness thereon. The same HI/PS film as that used in Example 2 was passed instantaneously through this solvent layer and, after retention for 3 seconds in the water, was taken out of the water and solvent and immersed for 10 seconds in methanol at 25 degrees C. The film was then air dried at room temperature.

The resulting film had an opacity of 79 percent and a smoothness of 128 seconds.

EXAMPLE 13

A solvent mixture of 90 parts of n-hexane and 10 parts of monochlorobenzene was applied by means of a roll coater on both surfaces of HI/PS, biaxially-drawn film in a quantity of 6 g./m.² on each surface. The film thus coated was then immersed for 10 seconds in warm water at 30 degrees C., then taken out, and dried by blowing cool air at 10 degrees C. thereagainst, whereupon a translucent film was obtained.

This film had an opacity of 67 percent and a smoothness of 467 seconds.

EXAMPLE 14

A biaxially-drawn film composed essentially of 50 parts of HI/PS and 50 parts of HD/PE (high density polyethylene) was immersed for 0.5 second in n-heptane heated to 70 degrees C., taken out, and air dried at room temperature.

The resulting film had an opacity of 85 percent and a smoothness of 280 seconds.

EXAMPLE 15

Toluene was caused to float on the surface of a water bath at 35 degrees C. to form thereon a toluene layer of 5 mm. thickness. A biaxially-drawn film of ABS resin was passed instantaneously through this layer and, after retention for 5 seconds in the water beneath, was withdrawn and immersed for 10 seconds in methanol at 25 degrees C. The film was then air dried at room temperature.

The resulting film had an opacity of 92 percent and a smoothness of 83 seconds.

For purposes of reference and information, the relationship between the quality of the product synthetic paper and the treatment conditions in this example when n-heptane is used as the solvent and HI/PS film is used as the basic film is indicated in Table 8.

TABLE 8

| n-Heptane | | Water temp., °C. | Treatment time in water, sec. | Film thickness after treatment, μ | Properties of resulting synthetic paper | | |
|---|---|---|---|---|---|---|---|
| Temp., °C. | Treatment time sec. | | | | Opacity, percent | Smoothness, sec. | IGT, cm./sec |
| 25 | 1 | 60 | 0 | 85 | 6.5 | 910 | >230 |
| | 1 | 60 | 3 | 99 | 69.6 | 148 | >230 |
| | 1 | 60 | 5 | 109 | 79.0 | 122 | >230 |
| | 1 | 60 | 10 | 126 | 89.1 | 67 | >230 |
| | 1 | 60 | 15 | 145 | 91.4 | 45 | >230 |
| 60 | 1 | 60 | 0 | 87 | 35.0 | 295 | >230 |
| | 1 | 60 | 2 | 106 | 74.4 | 152 | >230 |
| | 1 | 60 | 4 | 115 | 83.0 | 96 | >230 |
| | 1 | 60 | 9 | 134 | 87.0 | 60 | >230 |
| | 1 | 60 | 14 | 146 | 91.0 | 40 | >230 |
| 60 | 3 | 60 | 0 | 96 | 55.1 | 250 | >230 |
| | 3 | 60 | 2 | 104 | 77.4 | 125 | >230 |
| | 3 | 60 | 7 | 133 | 87.0 | 66 | >230 |
| | 3 | 60 | 12 | 148 | 90.0 | 47 | >230 |
| 60 | 5 | 60 | 0 | 96 | 69.5 | 160 | >230 |
| | 5 | 60 | 5 | 128 | 86.0 | 82 | >230 |
| | 5 | 60 | 10 | 148 | 90.1 | 54 | >230 |

What is claimed is:

1. A synthetic paperlike film suitable for writing and printing comprising a film of polystyrene resin containing particles of a rubber component having a particle size of the order of from 0.1 to 10 microns dispersed in said film, said film having been biaxially drawn with a drawing factor of at least six and the rubber particles being swollen at least at the surface of said film to provide said film with an outer surface rougher than that of the initial film and an opacity substantially greater than that of the corresponding non-swollen film, said film having a high surface strength, a large ink-receiving capacity and high ink-drying capacity.

2. A paperlike film according to claim 1 in which said rubber component is a conjugated diene polymer.

3. A paperlike film according to claim 1 in which film is comprised of two outer swollen surface layers and an unswollen control layer.

4. A process for producing paperlike film which comprises:
preparing a drawn film of a polystyrene resin containing particles of a rubber component having a particle size of the order of from 0.1 to 10 microns dispersed therein,
treating said film with a solvent at a temperature above 30 degrees C. but below the temperature at which the film undergoes pronounced deformation thereby to swell at least the surface of the film,
cooling the resulting film to a temperature below the treatment temperature and, moreover, below 40 degrees C. thereby to substantially stop the swelling action of said solvent with respect to the film and to form at least a paperlike layer thereon, and removing said solvent from said film,
said solvent being one compound of a mixture of compounds having characteristics such that
(1) when said solvent is caused to contact said drawn film to swell at least the surface thereof, the equation, $f = f_0 e^{-\gamma t}$ is satisfied, in which
$f_0$ is the thickness in microns of the film before contacting the solvent,
$f$ is the thickness in microns of an unswollen layer of the film after the film contacts the solvent,
$t$ is the treatment time in seconds, and
$\gamma$ is a constant determined by the solvent and the temperature at which the film contacts the solvent, being defined by the formula,
$\gamma = \gamma e^{aT}$
wherein
T is the treatment temperature in ° C.,
$\gamma$ is the value at T,
$\gamma$ is the value at 0° C.,
$a$ is the rate of variation of $\gamma$ with temperature, and
$e$ is a constant determined by the type of solvent, and
(2) the value of said $\gamma$ at the treatment temperature is at least $10^{-2}$ and at the cooling temperature is at most $10^{-3}$.

5. A process for producing papery film according to claim 4 in which only the surface regions of the film are rendered into a paperlike state and the remainder central region of the film is substantially unchanged.

6. A process for producing paperlike film according to claim 4 in which said solvent is such that the $\gamma$ value at room temperature is less than $10^{-3}$, and the swelling action of the solvent with respect to the film stops at room temperature.

7. A process for producing paperlike film according to claim 6 in which said solvent is a member selected from the group consisting of n-hexane, n-heptane, and n-octane.

8. A process for producing paperlike film according to claim 6 in which said solvent is a mixture of an aliphatic solvent selected from the group consisting of n-hexane, n-heptane, and n-octane and an aromatic solvent selected from the group consisting of benzene, toluene, and monochlorobezene.

9. A process for producing paperlike film according to claim 4 in which the swelling action of the solvent with respect to the film is stopped by causing the film which has been treated with solvent to contact at least one cooling roll at a temperature not higher than the temperature at which the action of the solvent stops.

10. A process for producing paperlike film according to claim 9 in which said cooling roll is one roll in a squeezing apparatus comprising a plurality of rolls.

11. A process for producing paperlike film according to claim 4 in which the treatment of the film at said treatment temperature is carried out by heating in a water bath the film with said solvent adhering to the surface thereof.

12. A process for producing paperlike film according to claim 11 in which said solvent is caused to float and thereby to form a solvent layer on at least one part of the upper surface of said water bath, and the film to be treated is introduced into the water bath through said solvent layer.

13. A process according to claim 4 in which said drawn film is obtained by biaxially drawing said film of polystyrene resin with a drawing factor of at least 6.

14. A process according to claim 4, in which said solvent is removed from said film by air drying.

References Cited

UNITED STATES PATENTS

| 3,020,597 | 2/1962 | Smith-Johannsen | 264—49 |
| 3,551,538 | 12/1970 | Yamamoto et al. | 264—49 |
| 3,562,374 | 2/1971 | Okamoto et al. | 264—49 X |
| 3,323,978 | 6/1967 | Rasmussen | 264— Dig. 8 |

FOREIGN PATENTS

| 1,066,061 | 4/1967 | Great Britain | 264—49 |
| 6512918 | 9/1966 | Netherlands | 264—49 |

PHILIP E. ANDERSON, Primary Examiner

U.S. Cl. X.R.

161—164, 166, 253, 402; 260—2.5 M, 892; 264—41, 210 R, 340, 343, Dig. 13, Dig. 62

UNITED STATES PATENT OFFICE
CERTIFICATE OF CORRECTION

PATENT NO. : 3,741,860
DATED : June 26, 1973
INVENTOR(S) : OTSUBO ET AL

It is certified that error appears in the above-identified patent and that said Letters Patent are hereby corrected as shown below:

In Claim 4, line 17, change "of" (first occurrence) to --or--.

Signed and Sealed this

Fifth Day of April 1977

[SEAL]

Attest:

RUTH C. MASON
Attesting Officer

C. MARSHALL DANN
Commissioner of Patents and Trademarks